United States Patent
Peace

(10) Patent No.: US 6,574,272 B1
(45) Date of Patent: Jun. 3, 2003

(54) METHOD AND APPARATUS FOR PASSING INTERACTIVE DATA OVER A MODEM LINK WITH LOW LATENCY

(75) Inventor: Jonathan E. Peace, Carlsbad, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/416,466

(22) Filed: Oct. 12, 1999

(51) Int. Cl.[7] .............................. H04B 1/38; H04L 5/16
(52) U.S. Cl. ...................... 375/222; 370/465; 370/477
(58) Field of Search ................................ 370/465, 477; 375/222

(56) References Cited

U.S. PATENT DOCUMENTS 5,768,350 A * 6/1998 Venkatakrishnan ......... 370/418

OTHER PUBLICATIONS

"Manging UDP Traffic", TCP/IP Bandwidth Management Series, No. 3 of 3, Nov. 1998, pp. 23–26, Packeteer, Inc.*

* cited by examiner

Primary Examiner—Stephen Chin
Assistant Examiner—Guillermo Munoz
(74) Attorney, Agent, or Firm—Farjami & Farjami LLP

(57) ABSTRACT

A method and apparatus for transmission of time critical data over a modem link is disclosed. Time critical data is intercepted by a modem at its host input-output port. The intercepted time critical data is injected directly at the top of the queue of data intended for transmission over the modem link. The injection of time critical data takes place at the input to the modulator in the form of specially identified frames, preferably of short duration. Time critical data is thus sent on a priority basis bypassing error correction circuits or routines, and bypassing data compression. At a receiving modem, time critical data is recognized in the demodulator as specially identified frames or packets. Such time critical data is recovered and immediately sent to the host without passing through the error correction process and without decompression. The present invention removes a significant amount of delay over modem links and substantially contributes to the quality of applications where time critical data must be timely processed, such as in voice over IP applications using modem links.

30 Claims, 3 Drawing Sheets

METHOD AND APPARATUS FOR PASSING INTERACTIVE DATA OVER A MODEM LINK WITH LOW LATENCY

BACKGROUND OF THE INVENTION

1. Technical Field

The present invention relates, generally, to transmission of data over telephone lines using a modem, and more particularly, to sending time critical data, such as interactive data, over a modem link with low latency.

2. Background Art and Technical Problems

Modern modem modulation schemes used for transmission of data over telephone lines typically employ an error correction process to improve transmission characteristics and throughput of data. Error correction is generally required to reduce block error rates to acceptable levels for reliable bulk data transmission across a typical telephone line link.

Modem based compression is also employed almost universally to increase effective data throughput speeds. Typical telephone lines such as the public switched telephone network, or PSTN, have a limited bandwidth that limits the speed at which data may be sent over the telephone lines. Compression reduces the number of bits that must actually be transmitted over a link of limited bandwidth, and the compressed data stream is decompressed at the other end of the link to recreate the original data. Using compression, more data can be effectively communicated across a link in less time, thereby increasing the effective speed at which communication takes place. For example, using compression, the time that it takes to download a file over a telephone line may be significantly reduced as compared to the same file downloaded with no compression.

However, error correction processes and compression are typically performed in a V.42 type scheme that adds significantly to the amount of delay experienced over the link in communicating data. The amount of data buffered in a V.42 compliant scheme introduces delay into the link which can be significant when time critical data is being transmitted over the link. In addition, a finite amount of time may be required to perform the error correction process on both sides of the link. Similarly, the data compression and decompression that must be performed on the data will consume additional time, and may contribute to the link delay.

Problems arise when multimedia or interactive data are being sent across a modem link. For example, in voice over IP (or Internet Protocol) applications, the latency added by error correction schemes and data compression may present a significant quality problem when time critical data is being transmitted over the link. The link delay may cause sluggish performance and slow response time in an interactive environment. While error compression schemes and data compression may have significant advantages in other environments, the link delay caused by such techniques has caused serious problems in applications where low latency is a requirement. Improved techniques are needed for the transmission of time critical data over modem links.

In the past, voice has been digitized in a modem, and the audio data was recovered directly at the other end of the modem link. This solution does not work satisfactorily, however, in an IP centric application, where the voice data is further transmitted over a network beyond the modem link itself.

Link delays may be a significant problem in applications where data is transmitted over a modem link, and then further transmitted over a network using an Internet protocol, e.g., an IP network. For example, a dial up connection to an Internet service provider, or ISP, who provides user connections to the Internet, presents such an environment. Data must be transmitted over a telephone line link between the user's computer and the location of the ISP server. Modems at both ends of the telephone line link are employed to transmit the data. The user is connected to the Internet via the ISP server, and the data is further transmitted over the IP network, perhaps to an Internet site at a great distance from the user's location. There are no known solutions for applications such as voice over IP where it is required to send data with low latency across a telephone line link connecting two modems, as well as across an IP network to a remote destination that may be as far away as another continent.

Thus, efforts to develop schemes for the transmission of data over modem links have not been altogether satisfactory, particularly where interactive data or other time critical data is being transmitted, and significant room for improvement still exists.

SUMMARY OF THE INVENTION

In accordance with an exemplary embodiment of the present invention, a method and apparatus for transmission of time critical data over a modem link is provided. Time critical data is intercepted by the modem at its host input-output port. The intercepted time critical data is injected directly at the top of the queue of data intended for transmission over the modem link. The injection of time critical data takes place at the input to the modulator in the form of specially identified frames, preferably of short duration. Time critical data is thus sent on a priority basis bypassing error correction circuits or routines, and bypassing data compression.

At the receiving modem, time critical data is recognized in the demodulator as specially identified frames or packets. Such time critical data is recovered and immediately sent to the host without passing through the error correction process and without decompression.

The present invention removes a significant amount of delay over modem links and substantially contributes to the quality of applications where time critical data must be timely processed, such as in voice over IP applications using modem links.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

Figure 1:
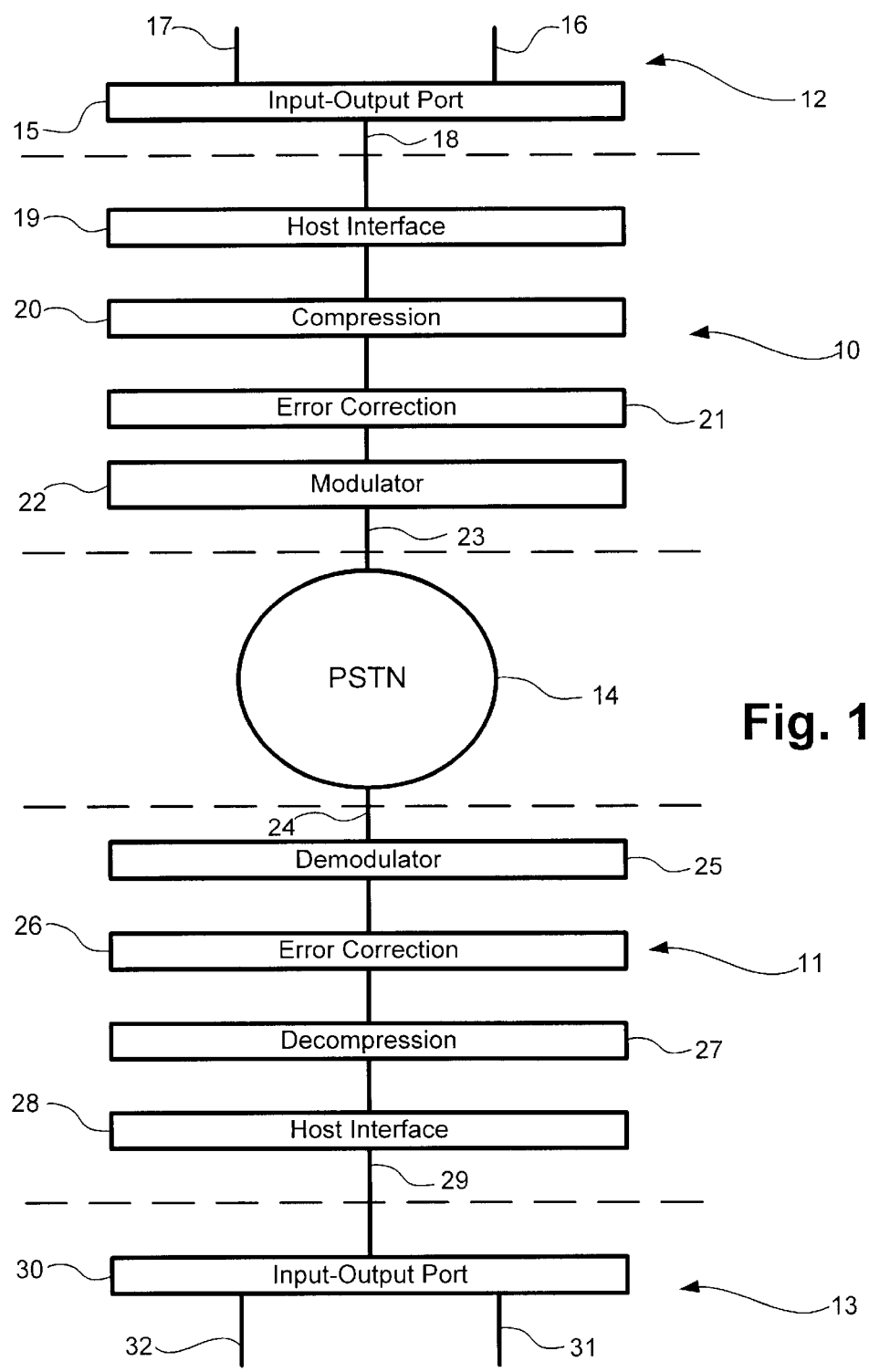
FIG. 1 is a block diagram schematic representation of a typical conventional link 25 between a client modem and a server modem.

FIG. 1 illustrates a block diagram schematic representation of a typical conventional link 10 between a client modem 10 and a server modem 11. The client modem 10 is connected to a host 12. For clarity, only the host input-output port 15 is shown. The illustrated client host 12 is a personal computer.

Bulk data 16 is combined with time critical data 17 at the host input-output port 15 and transmitted to the client modem 10 over a first cable or logical interface 18. In this example, the illustrated client modem 10 is an external modem.

The client modem 10 comprises a host interface 19, compression circuits 20, error correction circuits 21, and a modulator 22. Bulk data and time critical data are both received by the host interface 19 over the first cable 18 from the host input-output port 15. Both the bulk data and the time critical data are compressed in the compression circuit 20, and processed by the error correction circuit 21. The data is then coupled to the modulator 22 and processed for transmission over a telephone line 23.

The telephone line 23 is connected through the PSTN 14 to a telephone line 24, which is connected to a server modem 11. The server modem comprises a demodulator 25, an error correction circuit 26, a decompression circuit 27, and a host interface 28. The demodulator receives the data transmitted over the telephone lines 23, 24 and demodulates the data. The demodulated data in this example includes both bulk data and time critical data. Both the bulk data and the time critical data are passed to the error correction circuit 26 for processing. Both the bulk data and the time critical data are coupled to the decompression circuit 27 where the compressed data is decompressed. The data is then passed to the host interface 28.

The host interface 28 is connected to an input-output port 30 of an ISP host 13 over a second cable 29. In this example, the modem 11 is an external modem. Bulk data 31 is separated from time critical data 32 at the ISP host input-output port 30 and processed by the ISP host 13. For clarity, only the input-output port 30 of the ISP host 13 is shown in FIG. 1.

The conventional implementation shown in FIG. 1 suffers from significant latency and link delays. Time critical data 17 from the host 12 is delayed by processing for error correction in circuit 21 in the client modem 10, and by error correction processing in the error correction circuits 26 of the server modem 11. Time critical data 17 from the host 12 is further delayed by compression that occurs in the compression circuit 20 in the client modem 10, and by decompression that occurs in the decompression circuit 27 in the server modem 11. This link delay is undesirable in certain applications where time critical data must be rapidly processed to provide acceptable performance. It would be desirable to have a method and apparatus for avoiding such link delays of time critical data.

Figure 2:
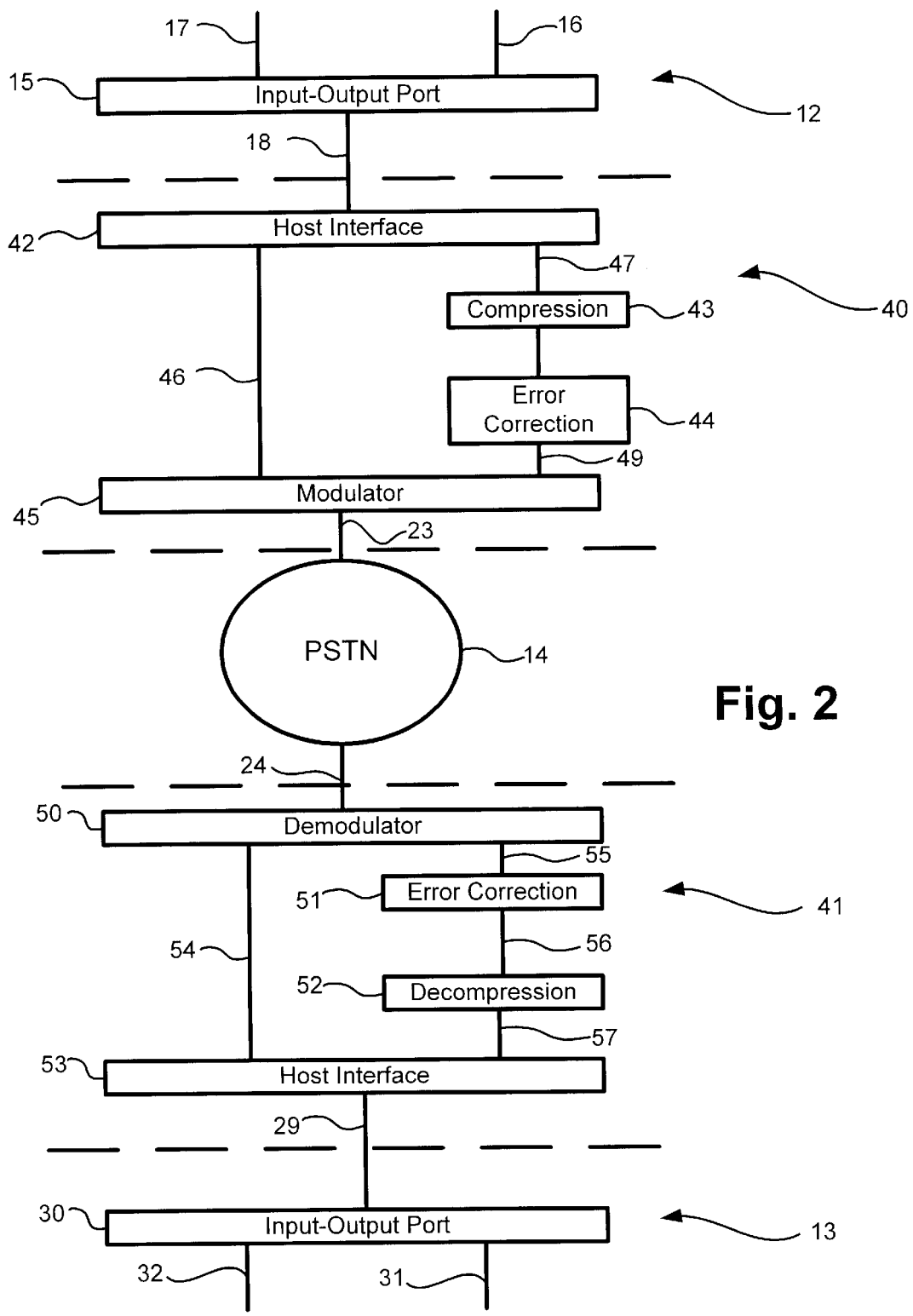
FIG. 2 is a block diagram of a link between a client modem and a server modem in accordance with the present invention.

An apparatus providing a low latency modem link and which reduces link delay of time critical data is shown in FIG. 2. In the illustrated embodiment, bulk data 16 and time critical data 17 are coupled to the host input-output port 15 and transmitted to a client modem 40 via a first cable, connection, bus or logical interface 18. Bulk data is preferably in the form of TCP (or Transmission Control Protocol) frames. Time critical data is preferably in the form of UDP (or User Datagram Protocol) frames. Both types of frames are sent to the client modem 40 over connection 18. For clarity, only the host input-output port 15 is shown for the client host 12. The client host 12 may be a personal computer, but is not limited to any particular type of computer apparatus. It may alternatively be a terminal, a workstation, or a server, or even a mainframe or minicomputer. In addition, the client modem 40 may be integrated in the client host computer 12, and the connection 18 may be a bus or other internal connection to the modem 40.

The client modem 40 includes a host interface 42 coupled to the input-output port 15 of the host 12. The host interface 42 is coupled to a modulator 45. The host interface is also coupled to a compressor or compression circuit 43. The host interface 42 separates time critical data from bulk data, and passes time critical data over correction or bus 46 directly to the modulator 45. Bulk data is coupled to the compression circuit 43 over connection or bus 47 for processing in a manner known in the art, preferably in accordance with V.42. In a preferred embodiment, the host interface 42 separates TCP frames (containing bulk data) from UDP frames (containing time critical data). In a preferred embodiment, the UDP frames are sent to the modulator over connection 46 as unnumbered LAPM (or Link Access Procedure for Modems) frames. The TCP frames are preferably sent as LAPM numbered frames to the compressor 43 over connection 47. While a preferred embodiment may employ a TCP/IP protocol, the present invention is not necessarily limited in principle to a TCP/IP environment, but may be advantageously used in any environment where bulk data/time critical data separation may provide improved performance.

The compression circuit is coupled to an error correction processor or error correction circuit 44. The error correction circuit 44 is coupled to the modulator 45 as shown in FIG. 2. When bulk data has been processed by the compression circuit 43, the compressed bulk data is coupled to the error correction circuit 44 over a connection or bus 48 for processing. The processed bulk data is then coupled to the modulator 45 over connection or bus 49, preferably as LAPM numbered frames. In accordance with the present invention, the time critical data 46 bypasses the compression processing 43 and the error correction processing 44, which helps to speed its transmission across the link without undue delay. Although in this particular example, the illustrated block diagram represents circuits, it will be understood by those skilled in the art that the blocks shown for the components of the client modem 40 represented in FIG. 2 may alternatively be implemented with software or combinations of hardware and software. The client modem 40 may be implemented partially, or if desired entirely, in software.

Time critical data 17 is intercepted by the client modem 40 at its host interface 42. The intercepted time critical data 46 is passed to the modulator 45 to be transmitted promptly over a telephone line 23. Time critical data 17 is preferably injected directly at the top of the queue of data intended for transmission over a telephone line 23. The injection of time critical data takes place at the input to the modulator 45 in the form of specially identified frames, preferably of short duration. Time critical data may be sent over the telephone line 23 in unnumbered information frames. Time critical data is thus sent on a priority basis bypassing error correction circuits or routines 44, and bypassing data compression 43.

The client modem 40 may include a buffer (for example, the compressor 43 and error correction unit 44 comprise a buffer) for temporarily storing data to be transmitted over connection 23. The remore modem 41 may include a buffer (for example, the de-compressor 52 and error correction unit 51 comprise a buffer) for temporarily storing data received over connection 23. Buffered data temporarily stored by the client modem 40 or remote modem 41 may be referred to as "data in flight." The quantity of data in flight divided by the link speed provides a queueing delay. Separating the time critical data from bulk data and sending the time critical data promptly (and by-passing buffers on the receive end 41) helps to reduce the data in flight quantity, and thus reduces the queueing delay for such data. LAPM frames typically have 16 buffers of 128 bytes, or 2048 bits. The queueing delay is 2048/50 kbps or 40 milliseconds, assuming a 50 kbps modem link at both ends 40 and 41 of the link. In a typical voice over IP application, delays greater than 100 milliseconds are noticeable. If the modem delay and speech compression delay are added to the queueing delay, the total delay will typically be well over 100 milliseconds, and will be noticeable. Thus, sending time critical data directly from the host interface 42 to the modulator 45 reduces the total delay considerably to significantly improve the performance of voice over IP applications, and other applications where time critical data is involved.

Figure 3:
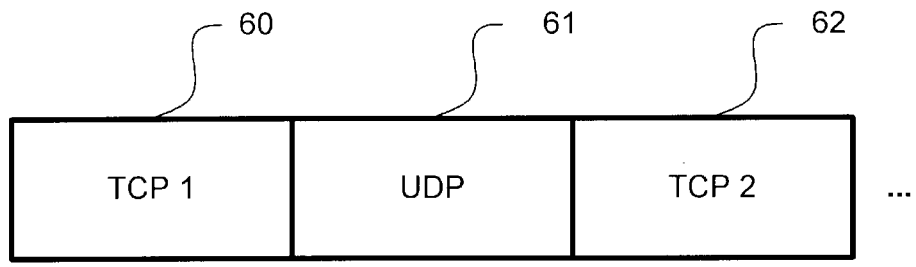
FIG. 3 is a schematic diagram of three example packets of data on connection 18 in FIG. 2.

The host 12 preferably passes PPP frames to the client modem 40 over connection 18. Bulk data is sent as a TCP frame. Multimedia data or time critical data is sent as UDP frames. An example of three data frames being sent over connection 18 is shown in FIG. 3. In this example, a first bulk data frame 60 is a TCP frame. Time critical data is sent as a UDP frame 61. The time critical data 61 is followed by another TCP frame 62 containing bulk data.

Figure 4:
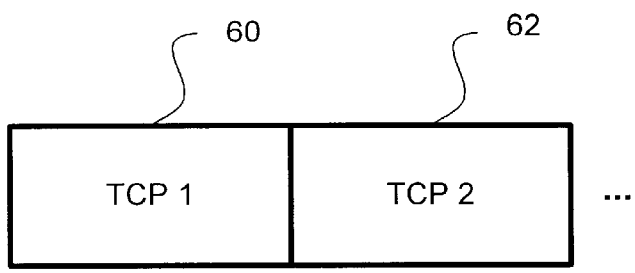
FIG. 4 is a schematic diagram of two packets of bulk data on connection 47 in FIG. 2.
Figure 5:
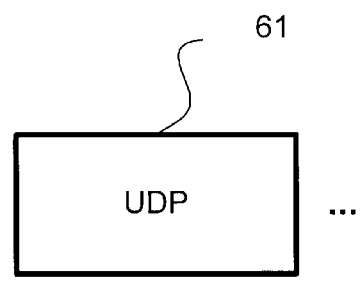
FIG. 5 is a schematic diagram of one packet of time critical data on connection 46 in FIG. 2.

The client modem 40 scans the incoming PPP frames for TCP or UDP frame types. The client modem 40 identifies TCP frames and sends them to the compressor 43 and error correction 44, and identifies UDP frames and sends them directly to the modulator 45 bypassing compression 43 and error correction 44. More specifically, the incoming PPP frames received over connection 18 are examined by the host interface 42, and TCP type frames forwarded to the compressor 43 over connection 47, while UDP type frames are forwarded directly to the datapump modulator 45 over connection 46, thus short-circuiting the error correction and compression processes for time critical data. Bulk data TCP frames are preferably forwarded unmodified to compression and LAPM error correction processes, preferably corresponding to the V.42 specification. For example, data being sent over connection 47 is shown in FIG. 4, where two bulk data frames 60 and 62 are shown as having been separated from the time critical data frame 61. These frames 60 and 62 are preferably sent as LAPM numbered frames. FIG. 5 shows the data being sent over connection 46, which in this example is the time critical data frame 61. This frame 61 is preferably sent as an LAPM unnumbered frame.

In a preferred embodiment, the host interface 42 may further discriminate among incoming data. Incoming UDP packets 61 may be further examined to discriminate UDP packets containing RTP (or Rapid Transport Protocol) frames from UDP packets 61 containing, for example, interactive control information. RTP frames may be used for transferring voice and video over IP, and may be given a higher priority than, for example, interactive control information that might also be sent in a UDP packet.

Referring to FIG. 2, the modulator 45 promptly transmits time critical data over the telephone line 23 as unnumbered information frames or UI frames. The modulator 45 may inject the time critical UDP data frames, normally as LAPM frames, at the top of the queue of data to be transmitted over the telephone line 23. Time critical data may be transmitted as 128 byte UI frames which typically will not adversely impact latency. Although typically not required with V.42, optionally, the time critical data may interrupt bulk data packets already in the process of being transmitted, and may transmit time critical data immediately.

The client modem 40 is coupled to the telephone line 23, which in this example is connected via the public switched telephone network or PSTN 14 to a telephone line 24. The telephone line 24 is coupled to a server or receiving modem 41.

The receiving or server modem 41 comprises a demodulator 50 coupled to the telephone line 24. The demodulator 50 is coupled directly to a host interface 53 via a connection or bus 54. The demodulator is also coupled to an error recovery processor or error correction circuit 51 via a connection or bus 55. The error correction circuit is coupled to an expander, decompressor or decompression circuit via a connection or bus 56. The decompression circuit is coupled to the host interface via a connection or bus 57. Although in this particular example, the illustrated block diagram depicts circuits, it will be understood by those skilled in the art that the blocks shown for the components of the server modem 41 represented in FIG. 2 may alternatively be implemented with software or combinations of hardware and software.

At the receiving modem 41, time critical data is recognized in the demodulator 50 as specially identified frames or packets. Such time critical data is recovered and immediately sent via connection 54 to the host interface 53 without passing through the error correction processor 51 and without decompression 52. More specifically, a UDP frame received by the demodulator 50 would be passed directly to the host interface 53, thus bypassing compression 52 and LAPM error recovery 51 buffers of the server modem 41.

In the receiving modem 41, bulk data, for example data in the form of TCP frames, is passed from the demodulator 50 to the error correction circuit 51 via connection 55. Error correction routines are performed on the bulk data, and the bulk data is passed to the decompression circuit 52 via connection 56. Preferably, V.42 compression and error recovery processes are employed in the server modem 41. The decompressed bulk data is then passed to the host interface 53.

Figure 6:
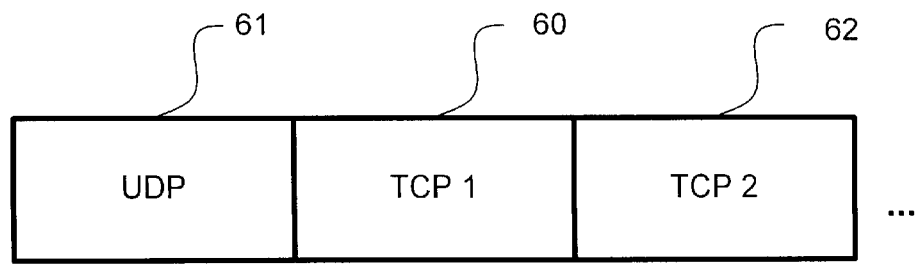
FIG. 6 is a schematic diagram of three packets of data on connection 29 in FIG. 2.

The host interface 53 is coupled to an ISP server or host 13 via a second cable, connection, bus or logical interface 29. Bulk data (in the form of TCP frames) are recombined with time critical data (in the form of UDP frames) and passed as a single data stream to the host 13 over connection 29. FIG. 6 illustrates an example of a recombined data stream passing over connection 29, where a UDP frame 61 containing time critical data has been inserted into the data stream in front of two TCP frames 60 and 62 containing bulk data.

The host interface may interrupt bulk data frames to insert a time critical data frame into the data stream. As shown in FIG. 2, the ISP host 13 includes an input-output port 30 coupled to the host interface 53. The input-output port 30 receives the data from the server modem 41, and separates time critical data 32 from bulk data 31. UDP frames containing time critical data are separated from TCP frames containing bulk data by the input-output port 30. Time critical data in the form of a UDP frame will emerge to the ISP access concentrator 30 as part of a PPP frame, except that such data will have bypassed the compression and error recovery buffers of both client and server modems 40 and 41. In accordance with the present invention, the time critical data 32 is received rapidly by the server 13 and may be quickly processed with little delay. In accordance with the present invention, a modem link is provided with low latency for time critical data which avoids link delay problems inherent in conventional modem configurations.

The ISP server 13 may be connected to an IP network or to the Internet. Data received by the receiving modem 41 may be further transmitted to a web site on the Internet, or to another remote location. IP frames contained in the data are routed across the IP network to their final destination. The ISP server 13 may be a workstation, but is not limited to any particular type of computer apparatus. It may alternatively be a personal computer, or even a mainframe or minicomputer. For clarity, only the input-output port of the ISP server 13 is shown in FIG. 2, it being understood by those skilled in the art that the server would additionally contain other conventional components, such as a CPU, RAM, disk drive, display, keyboard, data bus, and ROM, as well as other typical components.

Although the client modem 40 and remote modem 41 are shown connected over the PSTN 14, alternatively, the client modem 40 shown in FIG. 2 may be implemented with a direct connection to a network such as the Internet. Or the client modem 40 may be connected to a network via a dial-in connection.

Those skilled in the art will appreciate, after having the benefit of this disclosure, that various modifications may be made to the specific embodiment of the invention described herein for purposes of illustration without departing from the spirit and scope of the invention. The description of a preferred embodiment provided herein is intended to provide an illustration of the principles of the invention, and to teach a person skilled in the art how to practice the invention. The invention, however, is not limited to the specific embodiment described herein, but is intended to encompass all variations within the scope of the appended claims.

I claim:

1. A method of sending time critical data and bulk data over a modem link, comprising the steps of:
   receiving said time critical data and said bulk data combined in a datastream;
   separating said time critical data from said bulk data;
   sending said bulk data through a compression and error correction processing and a modulator to generate modulated processed bulk data;
   sending said time critical data to said modulator and bypassing said compression and error correction processing to generate modulated time critical data; and
   transmitting said modulated time critical data over said modem link prior to transmitting said modulated processed bulk data over said modem link.

2. The method according to claim 1, further comprising the steps of:
   receiving said modulated time critical data and said modulated processed bulk data over said modem link;
   demodulating said modulated time critical data to generate said time critical data and demodulating said modulated processed bulk data to generate processed bulk data;
   separating said time critical data from said processed bulk data;
   sending said processed bulk data through a decompression and error recovery processing to generate said bulk data; and
   sending said time critical data and bypassing said decompression and error recovery processing.

3. A method of sending time critical data and bulk data over a modem link, comprising the steps of:
   receiving User Datagram Protocol (UDP) type frames and Transmission Control Protocol (TCP) type frames combined in a datastream;
   separating said UDP type frames containing said time critical data from said TCP type frames containing said bulk data;
   sending said TCP type frames through a compression and error correction processing and a modulator to generate modulated processed TCP type frames;
   sending said UDP type frames to said modulator and bypassing said compression and error correction processing to generate modulated UDP type frames; and
   transmitting said modulated UDP type frames over said modem link prior to transmitting said modulated processed TCP type frames over said modem link.

4. The method according to claim 3, further comprising the steps of:
   receiving said modulated UDP type frames and said modulated processed TCP type frames over said modem link;
   demodulating said modulated UDP type frames to generate said UDP type frames and demodulating said modulated processed TCP type frames to generate processed TCP type frames;
   identifying said UDP type frames and said TCP type frames; and
   performing decompression processing and error recovery processing of said TCP type frames containing said bulk data;
   bypassing decompression processing and error recovery processing of said UDP type frames containing said time critical data.

5. The method according to claim 4, further comprising the steps of:
   combining said UDP type frames containing said time critical data and said TCP type frames containing said bulk data to generate said datastream; and
   transmitting said datastream including said UDP type frames containing said time critical data and said TCP type frames containing said bulk data to a host.

6. An apparatus for sending time critical data and bulk data over a modem link, comprising:
   means for receiving said time critical data and said bulk data combined in a datastream;
   means for separating said time critical data from said bulk data;
   means for sending said bulk data through a compression and error correction processing and a modulator to generate modulated processed bulk data;
   means for sending said time critical data to said modulator and bypassing said compression and error correction processing to generate modulated time critical data; and
   means for transmitting said modulated time critical data over said modem link prior to transmitting said modulated processed bulk data over said modem link.

7. The apparatus according to claim 6, further comprising:
   means for receiving said modulated time critical data and said modulated processed bulk data over said modem link;
   means for demodulating said modulated time critical data to generate said time critical data and demodulating said modulated processed bulk data to generate processed bulk data;
   means for separating said time critical data from said processed bulk data;
   means for sending said processed bulk data through a decompression and error recovery processing to generate said bulk data; and means for sending said time critical data bypassing said decompression and error recovery processing.

8. An apparatus for sending time critical data and bulk data over a modem link, comprising:
a modulator;
an error correction processor coupled to the modulator;
a compressor coupled to the error correction processor; and
a host interface coupled to the compressor, the host interface being operative to receive a datastream including said time critical data and said bulk data, the host interface being operative to separate said time critical data from said bulk data, the host interface being operative to send said bulk data to the compressor, the error correction processor and the modulator, the host interface being operative to send said time critical data to the modulator, bypassing the compressor and the error correction processor.

9. A method of sending time critical data and bulk data over a modem link, comprising the steps of:
receiving said time critical data and said bulk data combined in a datastream;
separating said time critical data from said bulk data;
performing error correction processing on said bulk data;
coupling said bulk data to a modulator after said performing said error correction processing;
coupling said time critical data to the modulator without performing said error correction processing; and
transmitting said time critical data and said bulk data over said modem link.

10. A method of reducing latency in transmission of a first type data by a modem capable of distinguishing between said first type data and a second type data, said method comprising:
receiving said second type data;
packetizing said second type data to generate LAPM numbered frames;
transmitting said LAPM numbered frames over a communication link;
receiving said first type data during said transmitting said LAPM numbered frames over said communication link;
ceasing said transmitting said LAPM numbered frames over said communication link in response to said receiving said first type data;
framing said first type data to generate LAPM unnumbered frames;
transmitting said LAPM unnumbered frames over said communication link; and
resuming said transmitting said LAPM numbered frames over said communication link.

11. The method of claim 10, wherein prior to said receiving steps, said method further comprising:
obtaining said first type data and said second type data combined in a datastream; and
separating said first type data from said second type data.

12. The method of claim of claim 10 further comprising: compressing said second type data prior to said packetizing.

13. The method of claim 10, wherein said second type data is data in Transmission Control Protocol (TCP) frames and said first type data is data in User Datagram Protocol (UDP) frames.

14. The method of claim 10, wherein said ceasing ceases said transmitting said LAPM numbered frames at the end of one of said LAPM numbered frames.

15. The method of claim 10, wherein said ceasing ceases said transmitting said LAPM numbered frames without waiting for the end of one of said LAPM numbered frames.

16. A method of reducing latency in transmission of a first type data by a modem capable of distinguishing between said first type data and a second type data, said method comprising:
receiving said second type data, as LAPM numbered frames, over a communication link;
depacketizing said second type data to generate depacketized data;
transmitting said depacketized data;
receiving said first type data, as LAPM unnumbered frames, over said communication link during said transmitting said depacketized data;
ceasing said transmitting said depacketized data in response to said receiving said first type data over said communication link;
deframing said first type data to generate deframed data;
transmitting said deframed data; and
resuming said transmitting said depacketized data.

17. The method of claim 16, wherein prior to said receiving steps, said method further comprising:
obtaining said first type data and said second type data combined in a datastream; and
separating said first type data from said second type data.

18. The method of claim of claim 16 further comprising: decompressing said depacketized data prior to transmitting said depacketized data.

19. The method of claim 16, wherein said second type data is data in Transmission Control Protocol (TCP) frames and said first type data is data in User Datagram Protocol (UDP) frames.

20. A modem capable of reducing latency in transmission of a first type data when communicating said first type data and a second type data over a communication link, said modem comprising:
a receiver capable of receiving said first type data and said second type data;
a processor capable of packetizing said second type data to generate LAPM numbered frames and further capable of framing said first data to generate LAPM unnumbered frames; and
a transmitter;
wherein said receiver receives said first type data while said transmitter is transmitting said LAPM numbered frames over said communication link, and said transmitter ceases transmitting said LAPM numbered frames over said communication link in response to said receiver receiving said first type data,
wherein said transmitter transmits said LAPM unnumbered frames, over said communication link, and thereafter said transmitter resumes transmitting said LAPM numbered frames over said communication link.

21. The modem of claim 20, wherein said receiver receives said first type data and said second type data combined in a datastream, and said processor separates said first type data from said second type data.

22. The modem of claim 20, wherein said processor compresses said second type data prior to packetizing.

23. The modem of claim 20, wherein said second type data is data in Transmission Control Protocol (TCP) frames and said first type data is data in User Datagram Protocol (UDP) frames.

24. The modem of claim 20, wherein said transmitter ceases transmitting said LAPM numbered frames at the end of one of said LAPM numbered frames.

25. The modem of claim 20, wherein said transmitter ceases transmitting said LAPM numbered frames without waiting for the end of one of said LAPM numbered frames.

26. A method of reducing latency in transmission of UDP data frames by a modem capable of distinguishing between said UDP data frames and TCP data frames, said method comprising:

receiving said TCP data frames;

packetizing said TCP data frames, as LAPM numbered frames, to generate packetized TCP data frames;

transmitting said packetized TCP data frames over a communication link;

receiving said UDP data frames during said transmitting said TCP data frames over said communication link;

ceasing said transmitting said packetized TCP data frames over said communication link in response to said receiving said UDP data frames;

framing said UDP type data, as LAPM unnumbered frames, to generate packetized UDP data frames;

transmitting said packetized UDP data frames over said communication link; and resuming said transmitting said packetized TCP data frames over said communication link.

27. The method claim 26, wherein prior to said receiving steps, said method further comprising:

obtaining said TCP data frames and said UDP data frames combined in a datastream; and separating said TCP data frames from said UDP data frames.

28. The method of claim 26, further comprising: compressing said TCP data frames prior to said packetizing.

29. The method of claim 26, wherein said ceasing ceases said transmitting said TCP data frames at the end of one of said LAPM numbered frames.

30. The method of claim 26, wherein said ceasing ceases said transmitting said TCP data frames without waiting for the end of one of said LAPM numbered frames.

* * * * *